United States Patent [19]
Beyer et al.

[11] Patent Number: 5,184,876
[45] Date of Patent: Feb. 9, 1993

[54] ANTI LOCK BRAKING SYSTEM

[75] Inventors: Claus Beyer, Schwieberdingen; Peter Dominke, Bietigheim-Bissingen; Eberhard Sonntag, Stuttgart, all of Fed. Rep. of Germany

[73] Assignee: Robert Bosch GmbH, Stuttgart, Fed. Rep. of Germany

[21] Appl. No.: 689,861

[22] PCT Filed: Nov. 11, 1989

[86] PCT No.: PCT/EP89/01352
§ 371 Date: Jun. 14, 1991
§ 102(e) Date: Jun. 14, 1991

[87] PCT Pub. No.: WO90/06874
PCT Pub. Date: Jun. 28, 1990

[30] Foreign Application Priority Data
Dec. 14, 1988 [DE] Fed. Rep. of Germany ....... 3841957

[51] Int. Cl.$^5$ .............................................. B60T 8/66
[52] U.S. Cl. ..................................... 303/106; 303/96; 303/103; 303/109
[58] Field of Search ............... 303/103, 102, 110, 105, 303/106, 107, 108, 109, 96; 364/426.01, 426.02, 426.03; 188/181 R, 181 A

[56] References Cited

U.S. PATENT DOCUMENTS

| | | | |
|---|---|---|---|
| 3,586,387 | 6/1971 | Riordan | 303/109 |
| 3,612,622 | 10/1971 | Riordan | 303/109 |
| 3,653,727 | 4/1972 | Kullberg et al. | 303/106 |
| 4,932,726 | 6/1990 | Iwata et al. | 303/109 X |
| 4,991,910 | 2/1991 | Shimanuki et al. | 303/108 X |
| 5,005,132 | 4/1991 | Yoshino | 303/103 X |
| 5,010,489 | 4/1991 | Masaki et al. | 303/96 X |
| 5,015,042 | 5/1991 | Yoshino | 303/109 X |
| 5,020,863 | 6/1991 | Yoshino | 303/96 |
| 5,043,898 | 8/1991 | Yoshino | 303/96 X |
| 5,065,327 | 11/1991 | Yahagi et al. | 303/96 X |

FOREIGN PATENT DOCUMENTS

| | | |
|---|---|---|
| 0045253 | 2/1982 | European Pat. Off. . |
| 2706132 | 8/1978 | Fed. Rep. of Germany . |
| 3707235 | 9/1988 | Fed. Rep. of Germany . |
| 2387824 | 11/1978 | France . |
| 8806544 | 9/1988 | World Int. Prop. O. . |

Primary Examiner—Douglas C. Butler
Attorney, Agent, or Firm—Felfe & Lynch

[57] ABSTRACT

The reference speed required for slip development is formed by using an auxiliary reference which specifies the reference slope during a sudden drop in wheel speed. In other circumstances, the speed of the second fastest wheel is included in the forming of a reference during the control action. In the absence of ABS control, the average speed of the non-driven wheels determines the reference speed. The change of reference speed forming from average value to use of the slope of the auxiliary reference and the speed of the second fastest wheel is made both at commencement of control action and even independently control action, when the sum of all wheel slips exceeds a threshold value a.

16 Claims, 3 Drawing Sheets

ANTI LOCK BRAKING SYSTEM

BACKGROUND OF THE INVENTION

From WO 88/06544 FIG. 7 with associated description, a method is known for the generation of a reference speed signal and an auxiliary reference speed signal in an antilocking control system, in which the wheel slip is used as a control variable to develop slippage value. With the auxiliary reference speed signal, the filtered speed signal of the fastest wheel determines its course. The slope of this auxiliary reference speed signal is used only to determine the slope of the reference speed signal during a sudden drop in wheel speed. Otherwise the size of the reference speed signal is as a rule determined by the second fastest wheel.

SUMMARY OF THE INVENTION

The generation of the reference signal in accordance with the invention, with switch-over to another control variable has the advantage, as a rule, that in the absence of ABS control, the reference signal is generated by the mean value of the speeds of the non-driven wheels. A driven wheel influences the size of the reference signal only when the wheel speed signal exceeds the reference signal.

In addition, the design in accordance with the invention has the effect that the controller can distinguish between light 'touch' braking and a braking on low $\mu$. With the development of the sum S of the amounts of slip, this does not exceed the threshold, and there is no switch-over before the commencement of control.

Contrary to this, the wheel speeds diverge during braking at low $\mu$, so that compared to the mean value of the speeds of non-driven wheels, i.e. the reference, slippages develop, the sum S of which exceeds the threshold a. There then occurs a switch-over to the reference being developed by the second fastest wheel, even before control commences. The presence of slip is thus recognized much sooner than without switch-over, i.e. the control commences earlier at low $\mu$.

DETAILED DESCRIPTION OF THE PREFERRED EMBODIMENT

Figure 1:
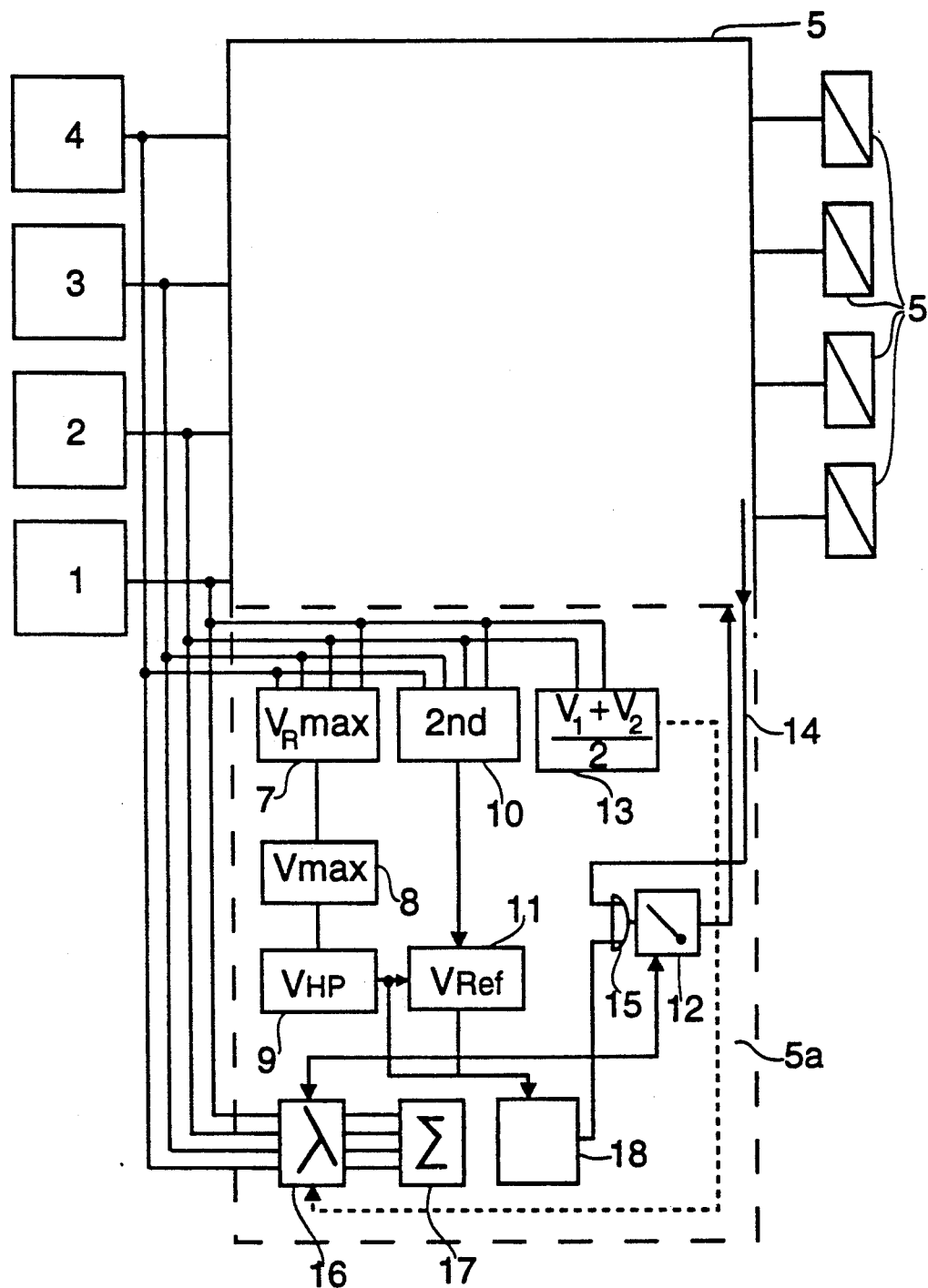
FIG. 1 shows a block diagram of an embodiment.

In FIG. 1, the speed sensors 1-4 allocated to the wheels of the vehicle supply their signals to an evaluation circuit 5. Sensors 1 and 2 are the transmitters of speed signals for the non-driven front wheels. On the basis of the transmitter signals, the evaluation circuit 5 for its part controls the 3/3 solenoids 6 which are allocated to the wheels, and varies the braking pressure on the wheels such that it prevents excessive brake slip.

The brake slip can be generated and compared with a target brake slip, or the slip can be used or utilised in another way for pressure control. Slip is here to be understood both as the difference between the reference speed and the wheel speed, and this difference related to the reference speed.

As shown above, a reference speed is needed in order to generate a slip value. This can be generated as shown in WO88/06544 FIG. 7.

Figure 4:
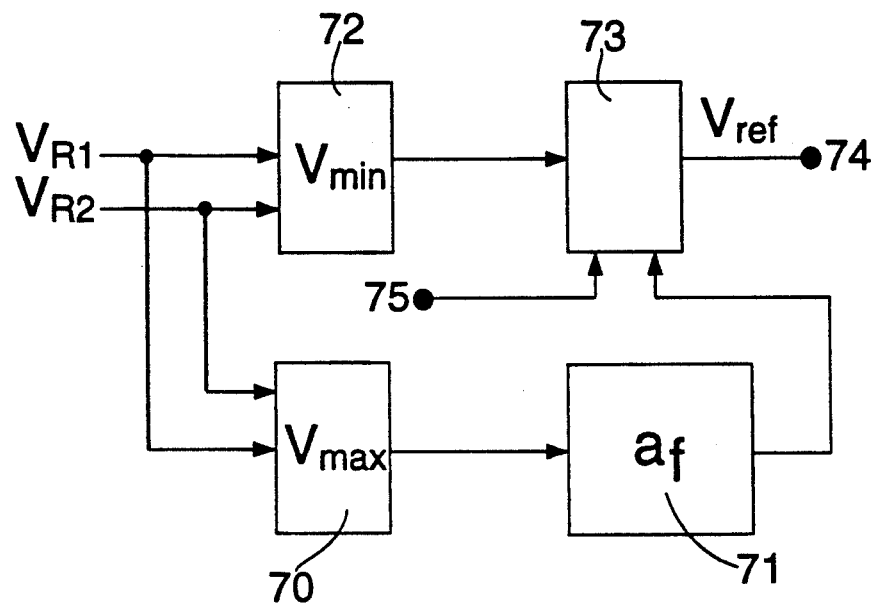
FIGS. 4–5 disclose prior art block diagram and explanatory diagram.
Figure 5:
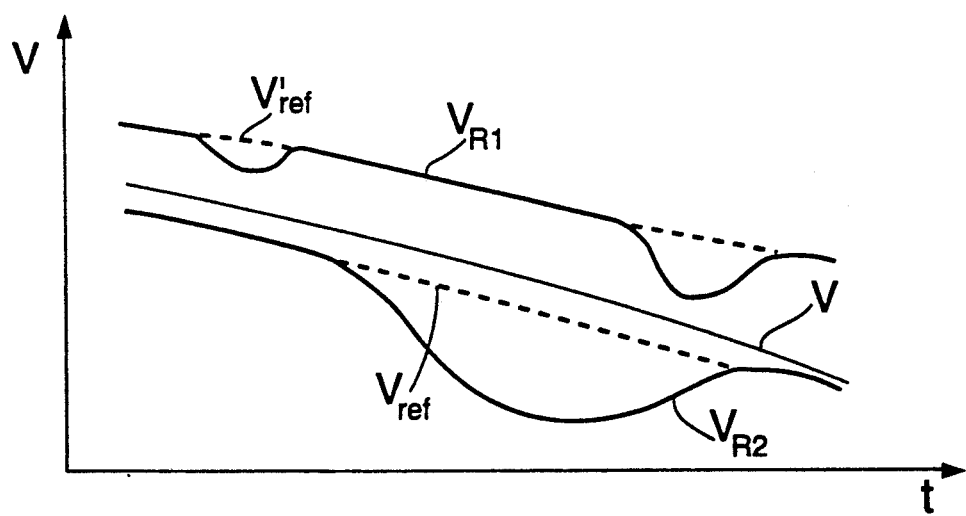

FIGS. 7 and 8 of WO 88/06544 are included herein as respective FIGS. 4 and 5.

The prior art embodiment of FIG. 4 operates with an auxiliary reference speed. In a unit 70 the maximum $V_{max}$ of two wheel speeds $V_{R1}$ and $V_{R2}$ is supplied to a unit 71 which outputs the slope of $V_{max}$ to a unit 73 as the calculated vehicle deceleration $a_F$. Meanwhile, a unit 72 selects the minimum $V_{min}$ of the two wheel speeds $V_{R1}$ and $V_{R2}$ to determine the second fastest wheel speed, and supplies this to unit 73. Unit 73 determines an actual vehicle reference speed $V_{Ref}$ from the speed $V_{min}$ from unit 72, the deceleration $a_F$ from unit 71, and a percentage from unit 75.

FIG. 8 shows the corresponding diagram for the emergency wheel R1, which is smaller diameter than normal wheels and therefore turns faster. $V_{R1}$ is the characteristic curve for this wheel and is used to generate an auxiliary reference value $V'_{Ref}$. $V_{R2}$ is the characteristic curve for the second fastest wheel R2, and is used to generate the actual reference speed $V_{Ref}$. In case wheel locking is likely to occur, i.e. a sudden drop in speed $V_{R2}$, the slope of the auxiliary curve $V'_{Ref}$ is used as the vehicle deceleration $a_F$ which is used to determine the slope of the actual reference speed $V_{Ref}$. The forming of the reference speed signal, in accordance with the invention, and of the auxiliary reference speed signal takes place in the lower part 5a of the evaluation circuit 5.

In a block 7 within the evaluation circuit, the speed of the fastest wheel is selected and the measurement results (auxiliary reference value) obtained in the cycle are stored in a shift register 8 for a multitude n of measurement results. When a new measurement value is stored, the oldest measurement value is deleted (moving time window).

Block 9 uses the measurement results stored first and last in the register 8 and the constant time between these measurement values to determine the slope $V_{HP}$ of the auxiliary reference values stored in register 8.

In a further selection block 10, the second highest wheel speed is selected and fed to a reference former 11. This uses the slope $V_{HP}$ of the auxiliary reference from block 9 and the second largest wheel speed $V_R$ to form a reference speed $V_{Ref}$. This is shown in FIG. 2, where $V_F$ describes the vehicle speed, $V_R$ the second highest wheel speed, and $V_{Ref}$ the reference speed formed in block 11 and used during a control action.

At $t_1$, the reference output value is approximately equal to the driving speed. In the range of $t_1$ to $t_2$, the slope $V_{HP}$ of the auxiliary reference determines the course of the reference $V_{Ref}$. At $t_2$ the velocity $V_R$ of the second fastest wheel becomes bigger than the reference velocity $V_{ref}$. It now lags with a specified slope of the wheel speed.

Figure 2:
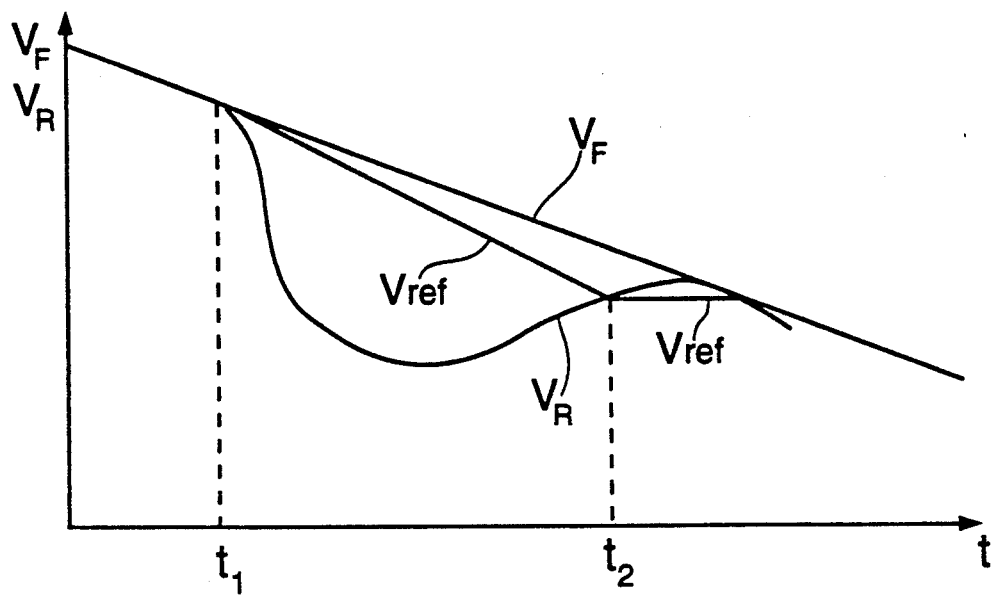
FIGS. 2 and 3 show explanatory diagrams.

The reference speed $V_{Ref}$ of the reference former 11 is fed to a selector switch 12, which is also fed with the front wheel speed averaged in an average former 13. The selector switch 12 supplies the evaluation circuit 5 with the average value $$\frac{V_1 + V_2}{2}$$

of the speeds of the non-driven wheels or the reference speed $V_{Ref}$ formed in accordance with FIG. 2 in block 11. The average value is normally used as reference speed, but when the ABS control comes into operation, then selector switch 12 is switched over via a line 14 and an OR gate 15 and the reference speed of block 11 is now fed to the evaluation circuit.

In a further block 16, the reference speed $V_{Ref}$ formed in block 11 is used to develop the slip values of the individual wheels. It is also possible to use the average value of the average former 12, as indicated by the dotted line in FIG. 1. The amounts of these slips are added in an adding unit 17, and the sum S of these wheel slips is fed to a comparator 18, which supplies a signal when the sum S exceeds a threshold value a and switches over the selector 12, even before commencement of the control action. The threshold a of the comparator can be varied (e.g. proportional), in relation to the slope of the auxiliary reference value, which is dependent on the vehicle deceleration. Threshold a can for example be varied in the range of the vehicle deceleration from $-0.4$ g to $-0.9$ g.

Figure 3:
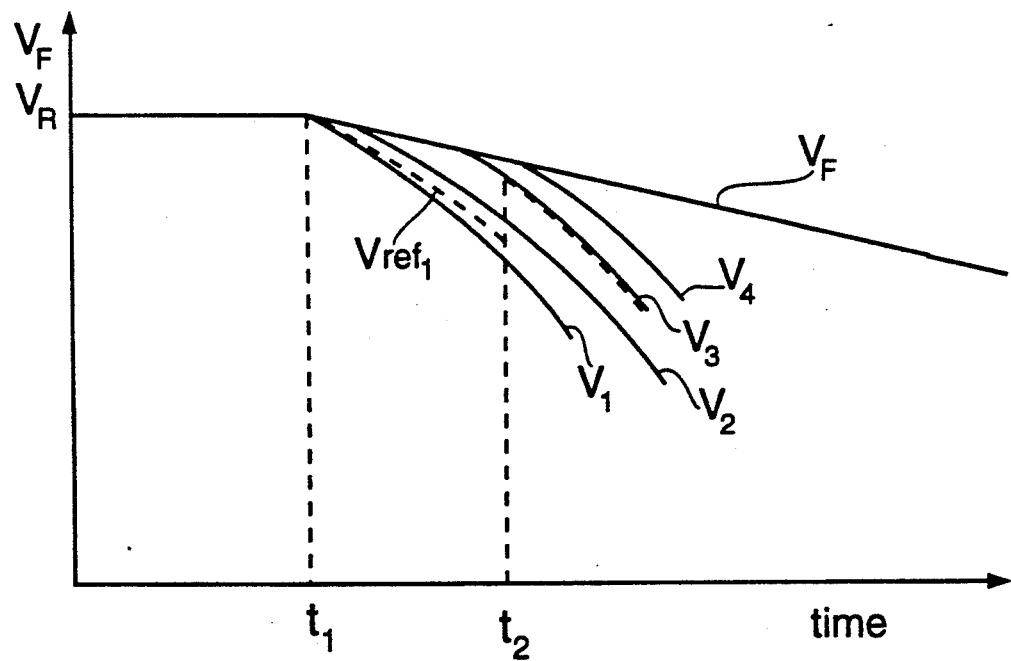

FIG. 3 shows the vehicle speed $V_F$ and the wheel speed $V_1$ to $V_4$ of the transmitters 1-4 in the phase shortly after commencement of braking ($t_1$) and at low $\mu$. After start of braking, the wheels run differently into the slip. At first, the mean value of the front wheel speed $V_1$ and $V_2$ becomes effective as the reference speed $V_{Ref1}$. No brake slip occurs which could trigger the control. In the adding unit 17, however, the slip amounts of all wheels are added up, and at $t_2$, the sum S exceeds the comparative value a, the reference speed then jumping to the second fastest wheel speed. Advantageously in the case of a complete rotation of the driving wheels, no switching occurs.

The invention can also be implemented by setting the evaluation circuit up as a computer, by appropriate configuration of the software.

We claim:

1. Antilocking control system for preventing locking of the wheels of a vehicle during braking, said vehicle having two driven and two non-driven wheels, said system being of the type comprising wheel speed sensors which generate wheel speed signals for the respective wheels, brake pressure control devices assigned to the vehicle wheels, and an evaluation circuit which receives wheel speed signals from said sensors, generates a reference speed, and produces control signals for said brake pressure control devices to prevent the wheels from locking, said evaluation circuit comprising
    means for generating an auxiliary reference value from the speed of the fastest turning wheel,
    means for determining the slope of the auxiliary reference value,
    means for generating a first reference speed from the speed of the second fastest turning wheel and, in case of a sudden drop in the speed of the second fastest wheel, from the slope of said auxiliary reference value,
    means for generating a second reference speed from one of the speed of the slowest non-driven wheel, the speed of the fastest non-driven wheel, and the average speed of the non-driven wheels.
    means for generating the slip of each wheel from the wheel speeds and one of the first reference speed and the second reference speed,
    means for forming the sum of the slips of all the wheels,
    means for comparing said sum to a threshold value, and
    means for selecting the first reference speed for producing said control signals when said sum exceeds said threshold value as well as when said control signals are being produced, and for selecting said second reference speed when said sum does not exceed said threshold value and said control signals are not being produced.

2. Antilocking control system as in claim 1 further comprising means for determining the slope of the reference speed selected by said means for selecting one of said first and second reference speeds, which slope represents the vehicle deceleration.

3. Antilocking control system as in claim 2 wherein said means for comparing said sum to a threshold value increases said threshold value in proportion to an increase in the vehicle deceleration.

4. Antilocking control system as in claim 2 wherein said means for comparing said sum to a threshold value increases said threshold value for a vehicle deceleration of $-0.4$ g to $-0.9$ g.

5. Antilocking control as in claim 1 wherein said means for selecting one of said first and second reference speeds selects said second reference speed when a complete rotation of the driven wheels is recognized.

6. Antilocking control system as in claim 1 wherein the slip of each driven wheel is generated from the wheel speeds and the first reference speed.

7. Antilocking control system as in claim 1 wherein the slip of each driven wheel is generated from the wheel speeds and the second reference speed.

8. Antilocking control system as in claim 1 wherein the second reference speed is generated from the average speed of the non-driven wheels.

9. Method for preventing locking of the wheels of a vehicle equipped with an antilocking control system during braking, said vehicle having two driven wheels and two non-driven wheels, said system being of the type comprising wheel speed sensors which generate wheel speed signals for the respective wheels, brake pressure control devices assigned to the vehicle wheels, and an evaluation circuit which receives wheel speed signals from said sensors, generates a reference speed, and produces control signals for said brake pressure control devices to prevent the wheels from locking, said method comprising
    generating an auxiliary reference value from the speed of the fastest turning wheel,
    determining the slope of the auxiliary reference value,
    generating a first reference speed from the speed of the second fastest turning wheel and, in case of a sudden drop in the speed of the second fastest wheel, from the slope of said auxiliary reference value,
    generating a second reference speed from one of the speed of the slowest non-driven wheel, the speed of the fastest non-driven wheel, and the average speed of the non-driven wheels,
    generating the slip of each wheel from the wheel speeds and one of the first reference speed and the second reference speed,
    forming the sum of the slips of all the wheels,
    comparing said sum to a threshold value,
    selecting the first reference speed for producing said control signals when said sum exceeds said threshold value as well as when said control signals are being produced, and
    selecting said second reference speed when said sum does not exceed said threshold value and said control signals are not being produced.

10. Method as in claim 9 further comprising determining the slope of the selected one of said first and second reference speeds, which slope represents the vehicle deceleration.

11. Method as in claim 10 wherein said threshold value is increased in proportion to an increase in the vehicle deceleration.

12. Method as in claim 9 wherein said threshold value is increased for a vehicle deceleration of $-0.4$ g to $-0.9$ g.

13. Method as in claim 9 wherein said second reference speed is selected when a complete rotation of the driven wheels is recognized.

14. Method as in claim 9 wherein the slip of each driven wheel is generated from the wheel speeds and the first reference speed.

15. Method as in claim 9 wherein the slip of each driven wheel is generated from the wheel speeds and the second reference speed.

16. Method as in claim 9 wherein the second reference speed is generated from the average speed of the non-driven wheels.

* * * * *